US012334760B2

(12) United States Patent
Atarashi et al.

(10) Patent No.: US 12,334,760 B2
(45) Date of Patent: Jun. 17, 2025

(54) POWER SUPPLY CIRCUIT FOR WORK MACHINE

(71) Applicant: TADANO LTD., Kagawa (JP)

(72) Inventors: Kazuya Atarashi, Kagawa (JP); Yoshikado Itasaka, Kagawa (JP)

(73) Assignee: TADANO LTD., Kagawa (JP)

( * ) Notice: Subject to any disclaimer, the term of this patent is extended or adjusted under 35 U.S.C. 154(b) by 557 days.

(21) Appl. No.: 17/771,326

(22) PCT Filed: Nov. 4, 2020

(86) PCT No.: PCT/JP2020/041232
§ 371 (c)(1),
(2) Date: Apr. 22, 2022

(87) PCT Pub. No.: WO2021/090845
PCT Pub. Date: May 14, 2021

(65) Prior Publication Data
US 2022/0399728 A1 Dec. 15, 2022

(30) Foreign Application Priority Data
Nov. 5, 2019 (JP) .................... 2019-200740

(51) Int. Cl.
*H02J 7/00* (2006.01)
*H02H 7/18* (2006.01)
(52) U.S. Cl.
CPC ............ *H02J 7/0016* (2013.01); *H02H 7/18* (2013.01); *H02J 7/0042* (2013.01)
(58) Field of Classification Search
None
See application file for complete search history.

(56) References Cited

U.S. PATENT DOCUMENTS

| 4,409,933 | A | * | 10/1983 | Inoue | F01P 11/16 |
|---|---|---|---|---|---|
| | | | | | 318/471 |
| 5,505,165 | A | * | 4/1996 | Kimoto | F02M 37/08 |
| | | | | | 123/41.31 |
| 5,828,967 | A | * | 10/1998 | Ueda | F01P 7/08 |
| | | | | | 701/1 |

FOREIGN PATENT DOCUMENTS

| JP | S60-124720 A | 7/1985 |
|---|---|---|
| JP | H11-155240 A | 6/1999 |
| JP | 2016-111808 A | 6/2016 |

OTHER PUBLICATIONS

Jan. 8, 2024, European Search Report issued for related EP Application No. 20884746.7.

(Continued)

*Primary Examiner* — Julian D Huffman
*Assistant Examiner* — Sadia Kousar
(74) *Attorney, Agent, or Firm* — Paratus Law Group, PLLC

(57) ABSTRACT

This power supply circuit for work machine is provided with a first switch for switching connection and disconnection of a first electrical path provided between a battery and a load which is driven with the power of the battery, and a second switch for switching connection and disconnection of a second electrical path bypassing the first switch. The second switch, when the first switch is switched from a state in which the first electrical path is connected to a state in which the first electrical path is disconnected, places the second electrical path in a connected state for a certain period and then, after the period elapses, switches the state in which the second electrical path is connected to a state in which the second electrical path is disconnected.

5 Claims, 3 Drawing Sheets

(56) References Cited

OTHER PUBLICATIONS

Dec. 22, 2020, International Search Report issued for related PCT application No. PCT/JP2020/041232.
Dec. 22, 2020, International Search Opinion issued for related PCT application No. PCT/JP2020/041232.

\* cited by examiner

POWER SUPPLY CIRCUIT FOR WORK MACHINE

CROSS REFERENCE TO PRIOR APPLICATION

This application is a National Stage Patent Application of PCT International Patent Application No. PCT/JP2020/041232 (filed on Nov. 4, 2020) under 35 U.S.C. § 371, which claims priority to Japanese Patent Application No. 2019-200740 (filed on Nov. 5, 2019), which are all hereby incorporated by reference in their entirety.

TECHNICAL FIELD

The present invention is applied to, for example, a work machine having a work device such as a crane device, and relates to a power supply circuit to which a battery and an electric load to which power of the battery is supplied are connected.

BACKGROUND ART

In general, a work machine having a work device such as a crane device travels by a drive force of an engine and performs work by the work device by driving a hydraulic pump. The work machine includes a plurality of electric loads driven by power, such as a starter motor for starting an engine, a lighting facility, and a controller for controlling operation of a work device, a battery for supplying power to the plurality of electric loads, and a power supply circuit to which the plurality of electric loads and the battery are connected, and the power of the battery can be supplied to each of the plurality of electric loads.

There is a case where the work machine is stored for a long time without performing work at a work place. When the work machine is stored in a work place having a high risk of fire occurrence, such as a petrochemical plant, a battery cutoff switch for disconnecting connection between a plurality of electric loads and a battery may be provided in a power supply circuit in order to lower the risk of fire occurrence (see, for example, Patent Literature 1).

In a work machine provided with a battery cutoff switch in a power supply circuit, after work by a work device is finished and an engine is stopped, the battery cutoff switch is operated to disconnect connection of a battery to a plurality of electric devices.

In some cases, a work machine includes an electric load that requires continuous supply of power from a battery even after work by a work device is finished and the engine is stopped. As an electric load requiring continuous supply of power of a battery after an engine is stopped, for example, there is a so-called urea SCR system as an exhaust gas purification device of a diesel engine. The urea SCR system requires a process of returning urea water to the tank after the engine is stopped.

CITATION LIST

Patent Literature

Patent Literature 1: JP 2016-111808 A

SUMMARY OF THE INVENTION

Problems to be Solved by the Invention

However, in the work machine, when disconnection of the battery by the battery cutoff switch and continuation of supply of power to the electric load after the work is finished and the engine is stopped are simultaneously required, the battery cutoff switch cannot be operated until the supply of power to the electric load is finished. For this reason, an operator of the work machine waits for the operation of the battery cutoff switch until there is no need to supply power to the electric load, and the work of disconnecting the connection of the battery becomes complicated.

An object of the present invention is to provide a power supply circuit for work machine capable of reliably disconnecting connection between a battery and an electric load after supply of necessary power to the electric load without stopping supply of necessary power to the electric load even after operation of the battery cutoff switch.

Solutions to Problems

In order to achieve the object, the present invention includes: a first switch that switches connection and disconnection of a first electrical path provided between a battery and a load driven with power of the battery; and a second switch that switches connection and disconnection of a second electrical path bypassing the first switch. When the first switch is switched from a state in which the first electrical path is connected to a state in which the first electrical path is disconnected, the second switch places the second electrical path in a connected state for a certain period and then, after the period elapses, switches the state in which the second electrical path is connected to a state in which the second electrical path is disconnected.

As a result, even after the operation of turning off the first switch, the power of the battery can be supplied via the second electrical path, and the connection between the battery and the electric load is disconnected after a certain period elapses after the first switch is turned off. Therefore, the necessary operation of the electric load is continued after the work by the work machine is finished, and the connection between the battery and the electric load is disconnected at the time when the necessary operation of the electric load is finished.

Effects of the Invention

According to the present invention, necessary operation of an electric load can be continued at the end of work by a work machine, and a connection between a battery and the electric load can be disconnected at the time when the necessary operation of the electric load is finished. Therefore, it is possible to perform an operation of turning off a battery cutoff switch without waiting for the end of the necessary operation of the electric load after the end of the work by the work machine, and it is possible to improve the work efficiency of an operator of the work machine.

DESCRIPTION OF EMBODIMENTS

Figure 1:
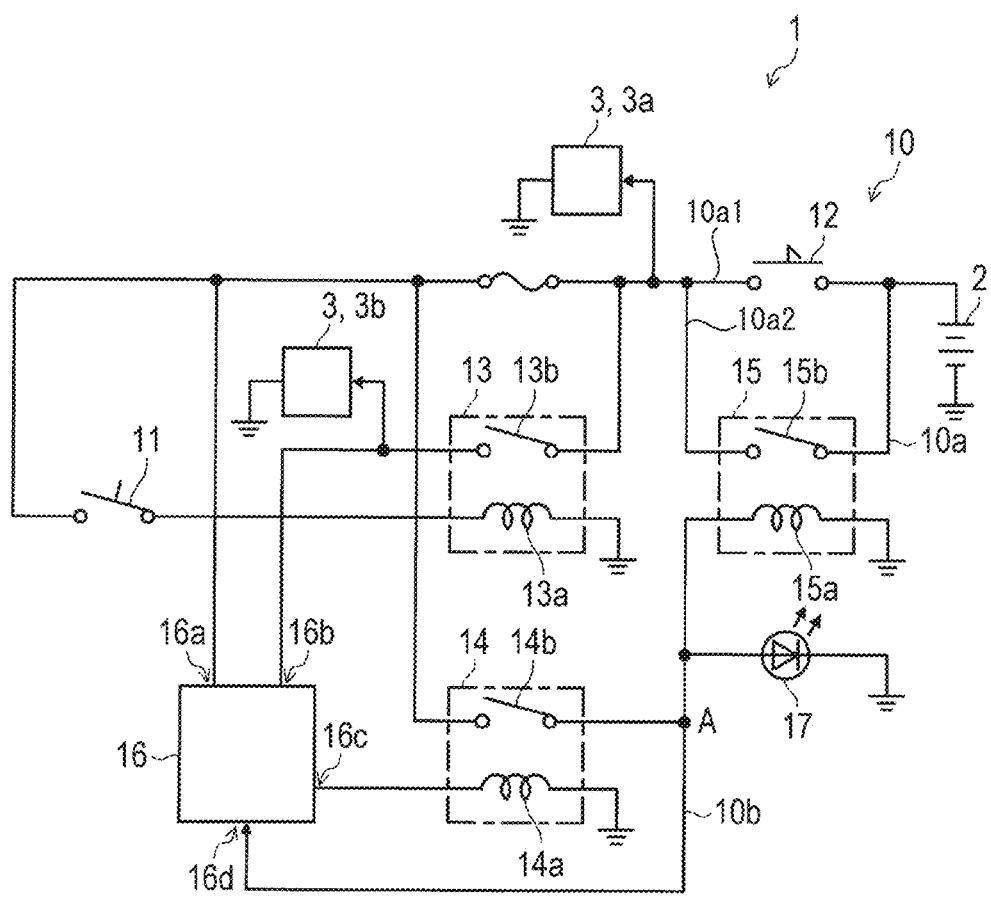
FIG. 1 is a schematic diagram of a power supply circuit 10 for a work machine 1 illustrating an embodiment of the present invention.

FIG. 1 is a schematic diagram of a power supply circuit 10 for a work machine 1 illustrating an embodiment of the present invention.

The power supply circuit of the present invention is applied to the work machine 1 including a work device that performs predetermined work, such as a crane vehicle, a high-place work vehicle, or an excavator.

The work machine 1 uses a drive force of a diesel engine to perform traveling and work by the work device. The work machine 1 includes a so-called urea SCR system as an exhaust gas purification device that chemically reacts nitrogen oxide (NOx) contained in gas discharged from a diesel engine with ammonia (NH3) to reduce the nitrogen oxide to nitrogen (N2) and water (H2O). The urea SCR system generates ammonia by injecting urea water stored in a tank toward a gas discharged from the diesel engine to hydrolyze the urea water, and chemically reacts the generated ammonia with nitrogen oxide contained in the exhaust gas. The urea SCR system has a process of operation of driving a pump for returning urea water in the system to the tank after the diesel engine is stopped.

The work machine 1 includes a battery 2 as a power supply and a plurality of electric loads 3 to which power of the battery 2 is supplied. The plurality of electric loads 3 includes a first electric load 3a to which power of the battery is supplied regardless of an on or off state of a key switch described later, such as an electric pump or a valve of the urea SCR system, and a second electric load 3b to which power of the battery 2 is supplied only in an on state of the key switch, such as an overload prevention device.

As illustrated in FIG. 1, the battery 2, the first electric load 3a, and the second electric load 3b are connected to the power supply circuit 10.

A key switch 11, a disconnect switch 12 as a battery cutoff switch, a main relay 13, a battery holding relay 14, a battery cutoff relay 15, an electronic control unit (ECU) 16 having functions as an electric signal output unit and a state detection unit, and a battery holding state display unit 17 as a state notification unit are connected to the power supply circuit 10.

The key switch 11 is provided, for example, in a cab on which an operator boards, turned from an off state to an on state by rotating a key inserted into a key hole in one direction, and turned from the on state to the off state by rotating the key in the other direction.

The disconnect switch 12 is a switch that is provided on the outer surface of the work machine 1 and directly disconnects an electrical path 10a*l* between the battery 2 and the plurality of electric loads 3 in the power supply circuit 10. The disconnect switch 12 is a rotary switch, and can regulate the rotation of the switch by, for example, a padlock at a position where the electrical path 10a*l* is disconnected.

The disconnect switch 12 is an example of a first switch that switches connection and disconnection of a first electrical path. The first electrical path is an example of the electrical path 10a*l* provided between the battery 2 and a load driven by power of the battery 2. The load driven by the power of the battery 2 is, for example, the first electric load 3a or the second electric load 3b described above.

The main relay 13 includes a coil portion 13a and a contact portion 13b which is a normally open contact in an off state in a normal state.

The battery holding relay 14 includes a coil portion 14a and a contact portion 14b which is a normally open contact in an off state in a normal state.

The battery cutoff relay 15 includes a coil portion 15a and a contact portion 15b which is a normally open contact in an off state in a normal state.

Figure 2:
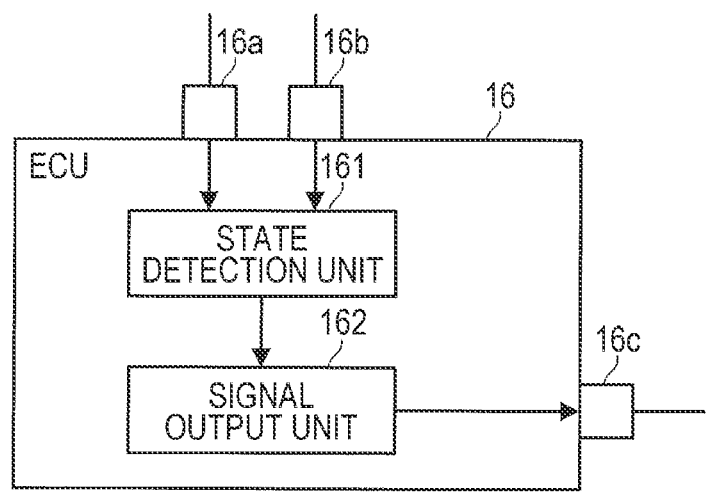
FIG. 2 is a functional block diagram of an ECU 16.

FIG. 2 is a functional block diagram of the ECU 16. The ECU 16 includes a central processing unit (CPU), a read only memory (ROM), and a random access memory (RAM). When the ECU 16 receives an input signal from a device connected to the input side, the CPU reads a program stored in the ROM on the basis of the input signal, stores a state detected by the input signal in the RAM, and transmits an output signal to a device connected to the output side. The ECU 16 also includes a battery power input unit 16a to which the power of the battery 2 is input, an on signal input unit 16b to which the power of the battery 2 is input as an electric signal in a state where the key switch is on, a holding signal output unit 16c that outputs an electric signal for holding the supply of the power of the battery 2 via the contact portion 15b of the battery cutoff relay 15, and a power supply holding signal input unit 16d to which an electric signal indicating a state where the supply of the power of the battery 2 is held via the contact portion 15b is input.

The ECU 16 executes a program stored in the ROM, and implements a state detection unit 161 and a signal output unit 162 which are examples of various functions of the ECU 16 according to the program.

For example, when the key switch 11 (ignition key) is switched from on to off, the state detection unit 161 detects that the key switch 11 is turned off. After the engine is stopped by turning off the key switch 11, post-processing by the urea SCR system is started.

The signal output unit 162 generates an electric signal for turning on the contact portion 13b using the detection result of the state detection unit 161, for example, when the disconnect switch 12 is turned on and the contact portion 14b is turned on, and inputs the electric signal to the holding signal output unit 16c. The holding signal output unit 16c outputs the electric signal to the contact portion 14b.

The electric signal output from the holding signal output unit 16c is, for example, a signal having a binary value of a high level or a low level. Specifically, for example, when the disconnect switch 12 is turned on and the contact portion 13b is turned on, the holding signal output unit 16c outputs a high-level signal. When the disconnect switch 12 is switched from on to off, the holding signal output unit 16c outputs a high-level signal for a certain period, and then outputs a low-level signal. In the present embodiment, a state in which an electric signal is output from the holding signal output unit 16c of the ECU 16 will be described as a state in which a high-level signal is output.

The battery holding state display unit 17 includes a light emitting diode that emits light by applying a voltage in the forward direction.

Specifically describing the power supply circuit 10, the first electric load 3a and the battery power input unit 16a of the ECU 16 are connected to the battery 2 in parallel via the disconnect switch 12. The second electric load 3b and the on signal input unit 16b of the ECU 16 are connected to the battery 2 in parallel via the disconnect switch 12 and the contact portion 13b of the main relay 13. The coil portion 15a of the battery cutoff relay 15 and the battery holding state display unit 17 are connected to the battery 2 in parallel via the disconnect switch 12 and the contact portion 14b of the battery holding relay 14. The battery 2 is connected to the coil portion 13a of the main relay 13 via the disconnect switch 12 and the key switch 11. The battery 2 is provided with a bypass electrical path 10a*2* that is connected in parallel with the disconnect switch 12 and bypasses the disconnect switch 12, and the bypass electrical path 10a*2* is provided with a contact portion 15b of the battery cutoff relay 15. The coil portion 14a of the battery holding relay 14 is connected to the holding signal output unit 16c of the ECU 16. One end of a state monitoring electrical path 10*b* is connected to a point A between the contact portion 14*b* of the battery holding relay 14 and the coil portion 15*a* of the battery cutoff relay 15 in the power supply circuit 10, and the other end of the state monitoring electrical path 10*b* is connected to the power supply holding signal input unit 16*d* of the ECU 16.

The bypass electrical path 10*a*2 is an example of a second electrical path that bypasses the disconnect switch 12. The contact portion 15*b* of the battery cutoff relay 15 is an example of a second switch that switches connection and disconnection of the bypass electrical path 10*a*2.

Figure 3:
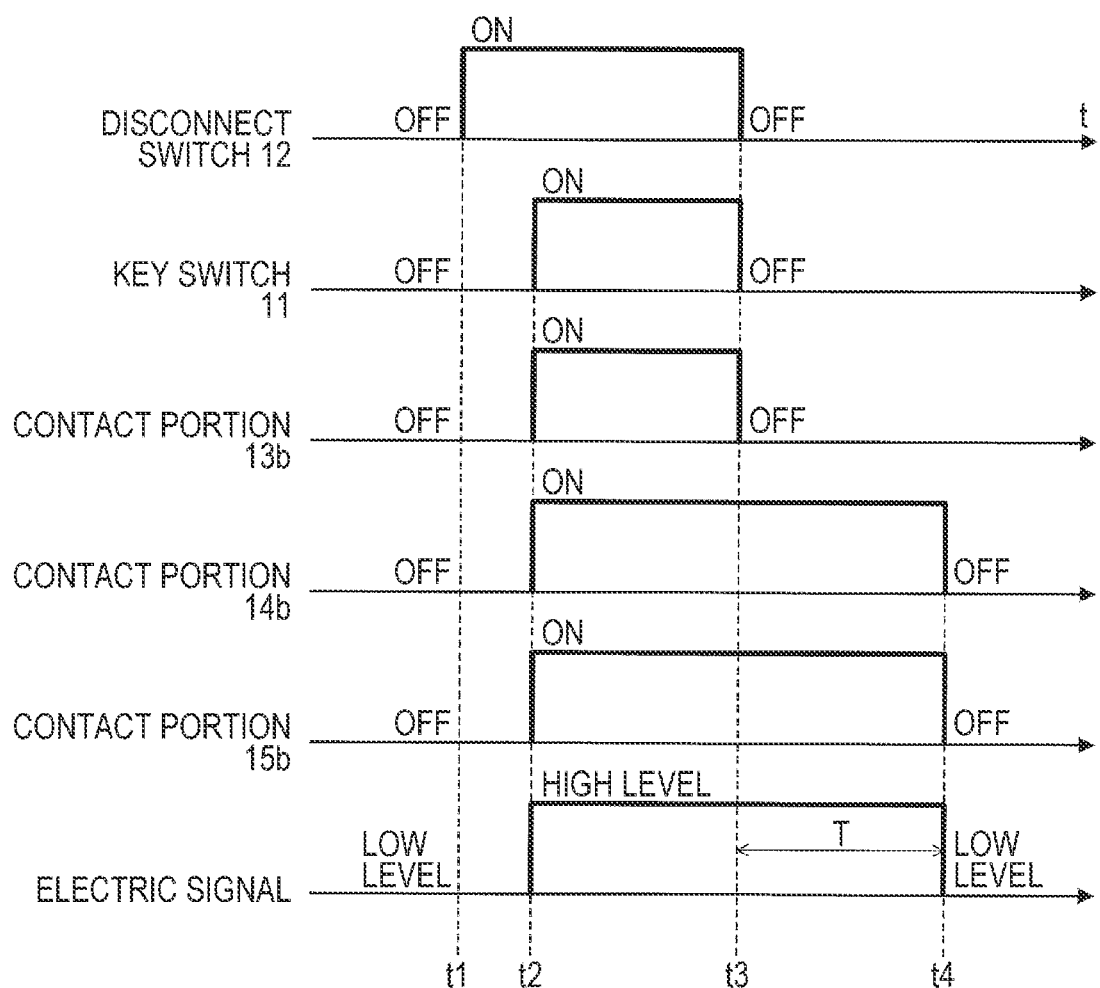
FIG. 3 is a timing chart for explaining operation of the power supply circuit path 10 of the work machine 1 illustrating an embodiment of the present invention.

Next, the operation of the power supply circuit 10 will be described with reference to FIG. 3. FIG. 3 is a timing chart for explaining operation of the power supply circuit path 10 for the work machine 1 illustrating an embodiment of the present invention.

In the work machine 1 configured as described above, when performing work by the work device, the operator first turns on the disconnect switch 12 at time t1 illustrated in FIG. 3. As a result, in the power supply circuit 10, the battery 2 is connected, and the power of the battery 2 is directly supplied to the first electric load 3*a* and the battery power input unit 16*a* of the ECU 16.

Next, at time t2 illustrated in FIG. 3, the operator turns on the key switch 11 and starts the engine. As a result, in the power supply circuit 10, electricity flows through the coil portion 13*a* of the main relay 13, and thereby, the contact portion 13*b* is closed and turned on, and the power of the battery 2 is supplied to the second electric load 3*b* and the on signal input unit 16*b* of the ECU 16.

When the power of the battery 2 is input as an electric signal to the on signal input unit 16*b* of the ECU 16, an electric signal is output from the holding signal output unit 16*c* of the ECU 16. That is, a high-level signal is output. When an electric signal is output from the holding signal output unit 16*c*, in the battery holding relay 14, the contact portion 14*b* is closed and turned on by electricity flowing through the coil portion 14*a*. As a result, the electricity of the battery 2 flows through the coil portion 15*a* of the battery cutoff relay 15 via the disconnect switch 12 and the contact portion 14*b* of the battery holding relay 14. When the power of the battery 2 flows to the coil portion 15*a*, the contact portion 15*b* of the battery cutoff relay 15 is closed and turned on. At this time, the power of the battery 2 is supplied to the first electric load 3*a*, the second electric load 3*b*, and the ECU 16 via the disconnect switch 12 and the contact portion 15*b* of the battery cutoff relay 15 connected in parallel to each other.

Electricity flowing between the contact portion 14*b* of the battery holding relay 14 and the coil portion 15*a* of the battery cutoff relay 15 is input as an electric signal to the power supply holding signal input unit 16*d* of the ECU 16 via the state monitoring electrical path 10*b*. As a result, the ECU 16 detects a state in which the power of the battery 2 is supplied via the bypass electrical path 10*a*2.

Electricity flowing between the contact portion 14*b* of the battery holding relay 14 and the coil portion 15*a* of the battery cutoff relay 15 turns on the battery holding state display unit 17. As a result, the operator can visually recognize a state in which the power of the battery 2 is supplied via the bypass electrical path 10*a*2.

When the work by the work machine 1 is finished and the work is not performed for a long time (for example, in a case where the work is not performed from the end of the work to the next day), the operator turns off the key switch 11 to stop the engine at time t3 illustrated in FIG. 3, and turns off the disconnect switch 12 to disconnect the connection of the battery 2 in the electrical path 10*a*1.

At this time, even when the operator performs an operation to turn off the disconnect switch 12 together with an operation to turn off the key switch 11, in the power supply circuit 10, the power of the battery 2 is supplied via the bypass electrical path 10*a*2 while the electric signal is output from the holding signal output unit 16*c* of the ECU 16. Specifically, in the battery holding relay 14, while the electric signal output from the holding signal output unit 16*c* of the ECU 16 flows to the coil portion 14*a*, the contact portion 14*b* is held in the on state, so that the electricity supplied from the battery 2 flows through the contact portion 14*b*. In the battery cutoff relay 15, while the contact portion 14*b* of the battery holding relay 14 is maintained in the on state, electricity supplied from the battery 2 flows to the coil portion 15*a*, so that the contact portion 15*b* is maintained in the on state.

The electric signal from the holding signal output unit 16*c* of the ECU 16 is output during driving of the diesel engine and after stopping of the diesel engine until the operation of driving the pump to return the urea water in the urea SCR system to the tank is finished. As illustrated in FIG. 3, the ECU 16 may stop the output of the electric signal from the holding signal output unit 16*c* at the timing when set time T for finishing the operation of the urea SCR system has elapsed, or may stop the output of the electric signal on the basis of the operation signal of the pump or the valve at the end of the operation of the urea SCR system.

When the output of the electric signal from the holding signal output unit of the ECU 16 is stopped at time t4 after the set time T has elapsed, electricity does not flow through the coil portion 14*a* of the battery holding relay 14, and the contact portion 14*b* is turned off. When the contact portion 14*b* of the battery holding relay 14 is turned off, electricity does not flow to the coil portion 15*a* of the battery cutoff relay 15, and the contact portion 15*b* is turned off. As a result, in the power supply circuit 10, the power supply of the battery 2 via the bypass electrical path 10*a*2 is disconnected.

As described above, according to the power supply circuit for work machine of the present embodiment, the bypass electrical path 10*a*2 is connected by the battery cutoff relay 15 by causing the ECU 16 to output an electric signal in a state where the electrical path 10*a*1 is connected by the disconnect switch 12, and the connection by the battery cutoff relay 15 is held while the electric signal is output from the ECU 16 in a case where the state where the electrical path 10*a*1 is connected is switched to the disconnected state by the disconnect switch 12 in the state where the electrical path 10*a*1 is connected by the battery cutoff relay 15.

As a result, necessary operation of the first electric load 3*a* can be continued at the end of work by the work machine 1, and a connection between the battery 2 and the first electric load 3*a* can be disconnected at the time when the necessary operation of the first electric load 3*a* is finished. Therefore, it is possible to perform an operation of turning off the disconnect switch 12 without waiting for the end of the necessary operation of the first electric load 3*a* after the end of the work by the work machine 1, and it is possible to improve the work efficiency of an operator of the work machine 1.

The ECU 16 detects the state of the battery cutoff relay 15 by detecting the flow of electricity in the coil portion 15*a* of the battery cutoff relay 15.

As a result, in a state where the key switch 11 and the disconnect switch 12 are each turned on, it is possible to check the on or off state of the battery cutoff relay 15, and it is possible to detect a failure of the power supply circuit 10.

The on state of the battery cutoff relay 15 is notified on the basis of electricity flowing through the coil portion 15a of the battery cutoff relay 15.

As a result, the operator of the work machine 1 can recognize the on state of the battery cutoff relay 15, so that it is possible to take measures such as repair when the power supply circuit 10 fails.

In the above embodiment, the pump of the urea SCR system has been described as the first electric load 3a that requires supply of power after the operation of turning off the disconnect switch 12, but the electric load is not limited to the urea SCR system, and any electric load may be used as long as it is an electric load that requires supply of power after turning off the disconnect switch 12.

In the above embodiment, the electric signal output from the holding signal output unit 16c is input to the coil portion 14a of the battery holding relay 14 to turn on the contact portion 14b, and electricity flowing by turning on the contact portion 14b is input to the coil portion 15a of the battery cutoff relay 15 to turn on the contact portion 15b, and thereby, the bypass electrical path 10a2 is connected. However, the present invention is not limited to this. For example, the bypass electrical path 10a2 may be connected by directly inputting the electric signal output from the holding signal output unit to the coil portion of the battery cutoff signal to turn on the contact portion.

The disconnect switch 12 may be a mechanical relay, a semiconductor relay, or the like as long as it can connect or disconnect the electrical path 10a1. The same applies to the battery cutoff relay 15.

In the embodiment of the present invention, the electric signal is stopped after a lapse of a certain period at the timing when the key switch 11 is switched from on to off, but the on and off timing of the electric signal is not limited thereto.

For example, it may be configured such that an electric signal is input from the holding signal output unit 16c of the ECU 16 to the coil portion 15a of the battery cutoff relay 15, and the output of the electric signal is stopped from the holding signal output unit 16c of the ECU 16 after a certain period of time elapses after the disconnect switch 12 is turned from on to off.

Even with such a configuration, since an electric signal is output for a certain period after the disconnect switch 12 is switched from on to off, power is continuously supplied from the battery 2 to the load 3, and thus urea solution can be returned to the tank after the engine is stopped.

Note that, for example, it is understood that the following aspects also belong to the technical scope of the present disclosure.

(1) A power supply circuit for work machine according to an embodiment of the present invention includes: a first switch that switches connection and disconnection of a first electrical path provided between a battery and a load driven with power of the battery; and a second switch that switches connection and disconnection of a second electrical path bypassing the first switch, in which, when the first switch is switched from a state in which the first electrical path is connected to a state in which the first electrical path is disconnected, the second switch places the second electrical path in a connected state for a certain period and then, after the period elapses, switches the state in which the second electrical path is connected to a state in which the second electrical path is disconnected.

(2) A power supply circuit for work machine according to an embodiment of the present invention is a power supply circuit for work machine to which a battery in which power is stored and an electric load to which the power of the battery is supplied are connected, the power supply circuit including: a battery cutoff switch that is provided in an electrical path between the battery and the electric load and switches between disconnection and connection of the electrical path; a bypass electrical path that bypasses the battery cutoff switch in the electrical path; an electric signal output unit that can output an electric signal in a state of being supplied with the power of the battery; and a battery cutoff relay that causes electricity to flow to a coil portion on the basis of the electric signal output from the electric signal output unit to connect the bypass electrical path by a contact portion, and disconnects a flow of electricity in the coil portion on the basis of a stop of output of the electric signal from the electric signal output unit to disconnect the bypass electrical path by the contact portion, in which the bypass electrical path is connected by the battery cutoff relay by causing the electric signal output unit to output an electric signal in a state in which the electrical path is connected by the battery cutoff switch, and connection by the battery cutoff relay is held while an electric signal is output from the electric signal output unit in a case where, in a state in which the electrical path is connected by the battery cutoff relay, a state in which the electrical path is connected is switched to a state in which the electrical path is disconnected by the battery cutoff switch. As a result, even after the operation of turning off the battery cutoff switch, the power of the battery can be supplied via the bypass electrical path, and the connection between the battery and the electric load is disconnected by stopping the output of the electric signal from the electric signal output unit. Therefore, the necessary operation of the electric load is continued after the work by the work machine is finished, and the connection between the battery and the electric load is disconnected at the time when the necessary operation of the electric load is finished.

It should be considered that the embodiments disclosed this time are examples in all respects and are not limitative. The scope of the present invention is defined not by the above description but by the scope of the claims, and it is intended that all modifications within meaning and scope equivalent to the claims are included.

REFERENCE SIGNS LIST

1 Work machine
2 Battery
3 Electric load
3a First electric load
3b Second electric load
10 Power supply circuit
10a1 Electrical path
10a2 Bypass electrical path
10b State monitoring electrical path
11 Key switch
12 Disconnect switch
15 Battery cutoff relay
15a Coil portion
15b Contact portion
16 ECU
17 Battery holding state display unit

The invention claimed is:

1. A power supply circuit for work machine comprising:
   a first switch that switches connection and disconnection of a first electrical path provided between a battery and a load driven with power of the battery;
   a second switch that switches connection and disconnection of a second electrical path bypassing the first switch;
   a relay connected between the second switch and the load; and
   a control unit that controls the second switch such that the second electrical path is in a connected state in a case where power of the battery directly supplied via the first switch and power of the battery supplied via the relay are detected when the first switch is in a state in which the first electrical path is connected,
   wherein, when the first switch is switched from a state in which the first electrical path is connected to a state in which the first electrical path is disconnected, the control unit controls the second switch to place the second electrical path in a connected state, and then, after a certain period elapses, switch to a disconnected state.

2. The power supply circuit for work machine according to claim 1,
   wherein the second switch is a battery cutoff relay, and includes a state detection unit that detects a state of the battery cutoff relay by detecting a flow of electricity in a coil portion of the battery cutoff relay.

3. The power supply circuit for work machine according to claim 1,
   wherein the second switch is a battery cutoff relay, and includes a state notification unit that notifies a state of the battery cutoff relay based on electricity flowing through a coil portion of the battery cutoff relay.

4. The power supply circuit for work machine according to claim 1,
   wherein the load includes a first load directly connected to the first switch and the second switch, and a second load connected to the first switch and the second switch via the relay, and
   wherein the relay is configured to be capable of disconnecting an electrical path to the second load regardless of the state of the first switch and the second switch.

5. The power supply circuit for work machine according to claim 1, further comprising:
   an operating switch that switches connection and disconnection of the relay.

* * * * *